United States Patent [19]

Orlandi

[11] Patent Number: 5,107,884

[45] Date of Patent: Apr. 28, 1992

[54] PAIR OF COOPERATING DISKS TO CONTROL THE DELIVERY OF LIQUID IN SO-CALLED SCREW TYPE VALVES

[75] Inventor: Alessio Orlandi, Castiglione D/Stiviere, Italy

[73] Assignee: Galatron S.r.l., Mantova, Italy

[21] Appl. No.: 610,383

[22] Filed: Nov. 7, 1990

[30] Foreign Application Priority Data

Nov. 8, 1989 [IT] Italy ................ 7106/89[U]

[51] Int. Cl.$^5$ ............ F16K 3/02; F16K 25/00; F16K 47/02
[52] U.S. Cl. ............ 137/454.5; 137/625.31; 251/208; 251/304; 251/118
[58] Field of Search ......... 137/269, 270, 315, 454.2, 137/454.5, 454.6, 625.31; 251/205, 208, 288, 304, 314, 118, 127, 310

[56] References Cited

U.S. PATENT DOCUMENTS

| 3,780,758 | 12/1973 | DeVries | 137/454.6 |
| 3,807,455 | 4/1974 | Farrell | 137/454.6 |
| 3,831,621 | 8/1974 | Anthony et al. | 137/454.6 |
| 4,005,728 | 2/1977 | Thorp | 137/454.6 |
| 4,331,176 | 5/1982 | Parkison | 137/454.5 |
| 4,651,770 | 3/1987 | Denham et al. | 137/454.5 |
| 4,738,277 | 4/1988 | Thomas | 137/454.5 |
| 4,821,765 | 4/1989 | Iqbal et al. | 137/454.5 |
| 4,823,832 | 4/1989 | Rodstein | 137/454.5 |
| 4,896,693 | 1/1990 | Rodriguez | 137/454.5 |
| 4,903,725 | 2/1990 | Ko | 137/454.5 |

FOREIGN PATENT DOCUMENTS

| 0003459 | 8/1979 | European Pat. Off. | 137/625.31 |
| 3031371 | 2/1982 | Fed. Rep. of Germany | 137/625.31 |

Primary Examiner—George L. Walton
Attorney, Agent, or Firm—McGlew & Tuttle

[57] ABSTRACT

The invention relates to a pair of overlapping ceramic disks for the opening and closing of screw type valves, where there is a fixed disk (11) with lateral slots inside the valve body and another disk (12) which rests on top of the fixed one (11) and where the fixed disk (11;31) has at least one segment like slot (11a;31a) closed at the perimeter and the movable disk (12;32) has at least one lateral opening (12;32a) which is open both at the bottom towards the fixed disk and radially towards the lateral slots (13a) of the valve body, and closed at the top by a spoked surface so as to improve the water flow conditions.

5 Claims, 1 Drawing Sheet

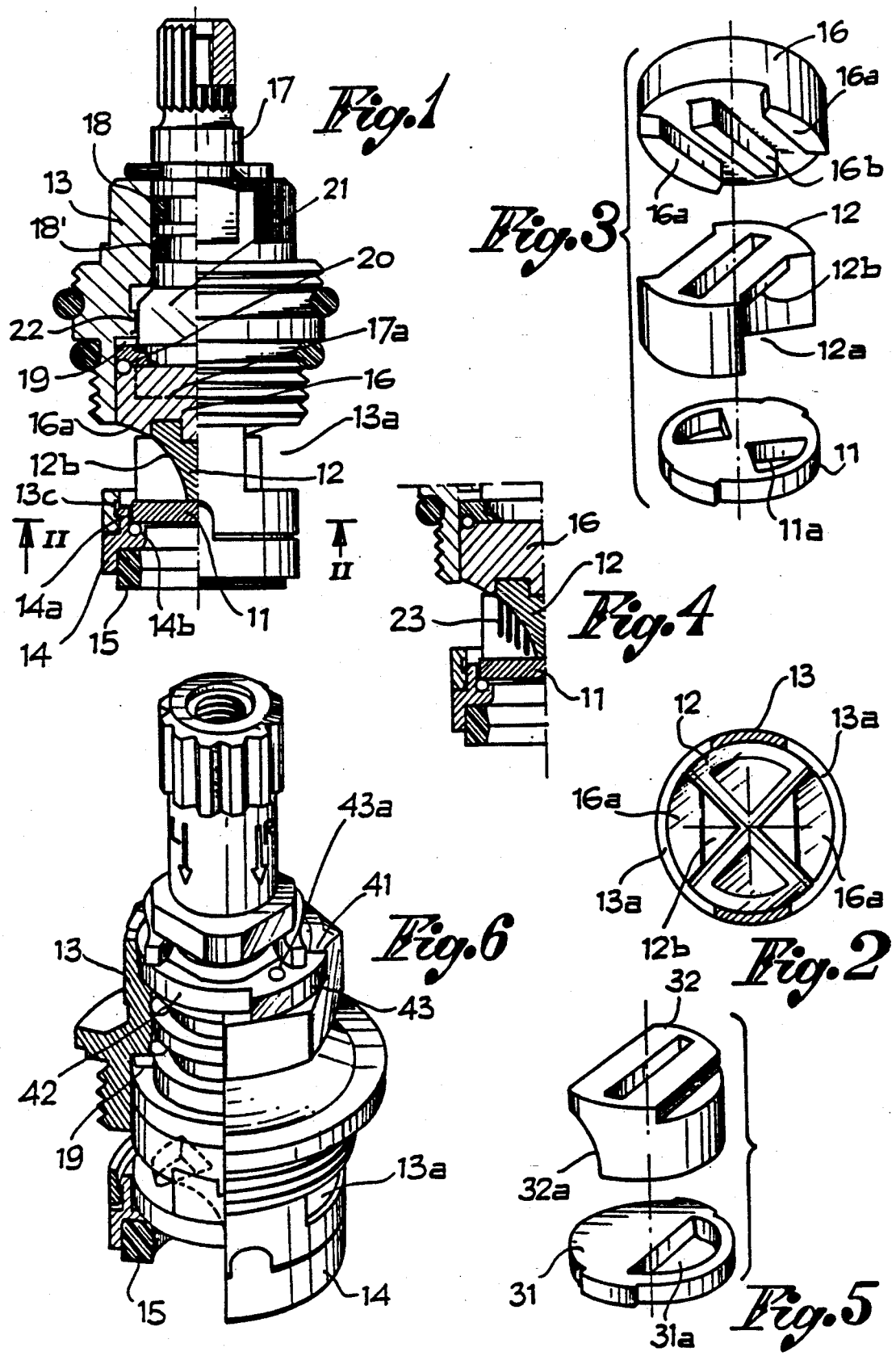

5,107,884

PAIR OF COOPERATING DISKS TO CONTROL THE DELIVERY OF LIQUID IN SO-CALLED SCREW TYPE VALVES

FIELD OF THE INVENTION

The present invention relates to sealing and control means for the delivery of liquid in valves for sanitary systems, especially in screw types valves with disks in ceramic or similar materials.

BACKGROUND OF THE INVENTION

Two overlapping disks have already been used in the screw type valves for the controlling or intercepting of fluid flow, said disks having openings or slots positionable either far from or in partial or total correspondence of each other.

One of the two disks is fixed whilst the other is controlled and movable in rotation on the fixed one so as to position the slots or openings of one far from or in partial or total correspondence of the other. According well known executions, the slots or openings of each disk occupy a section or panel of a surface and are also closed at the perimeter. The usual configuration of the fixed and movable overlapping disks still creates problems for the correct delivery of the fluid without having pressure loss and without limiting the theorectic flow.

SUMMARY AND OBJECTS OF THE INVENTION

The present invention aims to solve this problem by proposing interagent ceramic disks with a new configuration, as far as the movable disk is concerned, or providing a much smoother fluid flow with a lower level of noise and a turbulence to achieve a larger flow capacity. The using of disks with a new configuration also establishes another advantage, that being the repositioning of the seal of the movable disk, fitting it after the latter at a level to which the working temperature is reduced by an entrainment element which is connected to the movable disk. In addition the movable disk, or more precisely its openings can be fitted with notches which interrupt the flow and reduce the noise of the delivered liquid without loss of the flow capacity.

In accordance with the invention a pair of disks are mounted in a valve body. One of the disks is rigidly connected to the valve body and the other disk is movable by means of a control rod. Both disks have openings in them and when the openings are aligned fluid is allowed to flow through the valve body. When the movable disk is moved and the openings are not at all aligned the flow of fluid is blocked. The opening in the movable disk is shaped with a special parabolic curve in order to smoothly pass the water through the valve. In this parabolic curve surface the aforementioned notches can be fitted to reduce noise.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which a preferred embodiment of the invention is illustrated.

BRIEF DESCRIPTION OF THE DRAWINGS

In the drawings:

FIG. 1 is a partial axial sectional view of the screw type valve with a 90° rotation opening or closing defined by internal limiting devices;

FIG. 2 is a sectional view of the movable disk on the lines II—II FIG. 1;

FIG. 3 is a perspective view of the disks and the entrainer;

FIG. 4 is a part of the valve with notches which interrupt the flow;

FIG. 5 is a pair of disks for screw type valves with a 180° opening and closing rotation; and FIG. 6 is a screw type valve like the one in FIG. 1, but with rotation limiting devices on the outside of its body.

DETAILED DESCRIPTION OF THE PREFERRED EMBODIMENTS

The drawings show the two overlapping disks (11, 12) which are incorporated inside a valve body (13) which is designed to be coordinated for screwing, and has peripheral seals (13b) interpositioned in taps for sanitary systems, in line with a water delivery circuit. The valve body (13) has flow outlet radial slots (13a), and the disks (11, 12) are at the same level of said slots, and comprise a lower fixed disk (11) and an upper one (12) which rotates on top of the fixed one.

In more detail, the fixed disk is splined to a diskholder ring (14) which is hooked to the lower part of the valve body (13). This ring has notched tabs (14a) engaged with shoulders cut into said valve body. The fixed disk (11) rests on the ring (14) with the interposition of a seal (14b); a basic annular seal (15) for the sealing of the water inlet is fitted to the bottom of the ring (14).

The upper movable disk (12) is splined to an entrainer (16) which is, in turn, splined to the lower end of a control rod (17). The top of the control rod (17) is partially broached and equipped with a control handle (not shown). The entrainer (16) has two lateral tabs (16a) and a central tab (16b) which are all parallel to each other and designed to engage the movable disk (12) as in the drawing. In turn, the rod (17) has a lower placed tab (17a) engaged in a straight or crossed slot (17c) cut into the entrainer (16). Furthermore, the rod (17) is rotated inside the valve body (13) with the interposition of seals (18, 18') and an anti-friction ring (19) all at different levels.

A seal (20) can also be placed between the entrainer (16) and the control rod (17). This seal (20) is not in contact with the movable disk (12) and therefore works at a lower temperature than said disk.

In a screw valve with a 90° opening and closing rotation (FIGS. 1 and 3) the fixed disk has two segment like slots (11a), closed at the perimeter whereas the movable disk (12) has two openings (12a) which are open at the bottom towards the fixed disk (11) and radially towards the slots (13a) of the valve body (13), but closed at the top towards the entrainer (16). The angular amplitude of the openings (12a) of the movable disk (12) is similar to the amplitude of the slots (11a) of the fixed disk (11), be nevertheless smaller than the spaces between said slots (11a) of the fixed disk. Seen from below, the movable disk (12) has an "X" shape which is made up of the two openings (12a) which alternate with two solid parts. In each case, the top of both openings (12a) are defined by a spherical or parabolic spoked surface which rises from the bottom, more or less in the centre of the disk, towards the perimeter where it joins the surface of the entrainer above (16) which also has spoked lateral tabs (16a). The surface more or less reaches the top of the radial slots (13a) of the body (13). The rod has at least one lateral shoulder (21) which operates together with a blocking notch (22) integral with the body so as to limit the rotation of the rod (17) to 90° and so as to position the openings of the movable disk in correspondence with or away from the ones of the fixed disk.

Tests have proven that this configuration of the disks, especially the movable one (12), allows an improved flow of liquid and a greater flow capacity with respect to known realizations under the same conditions.

In a screw type valve with a 180° opening and closing rotation as in FIG. 5 of the drawing, the fixed disk (31) has only one semi-circular slot (31a) and the movable disk (32) only one lateral opening (32a) with a spoked top and joint to a corresponding lateral tab of the entrainer in a similar way to that which has been described above. Some appropriate parts will be fitted on the control rod so as to limit the rotation of the movable disk (32).

In both cases, the parts which will limit the rotation of the control rod (17) can be fitted onto the outside of the body (13), at the top. These parts therefore comprise (FIG. 6) two shoulders (41) which are angularly spaced and cut into the top of the body (13) and a ring (42) splined and rotating with the rod (17), having at least one radial notch (43) designed to alternately interact with said shoulders and be axially stopped by a Seger or similar on the rod itself.

The ring can be splined into two different phase angle positions for the opening with a right or left rotation of the rod. The positions are clearly marked (43a) on the notch (43) and by the arrows "L" and "R" on the rod.

Finally, notches (23) of graduated length can be cut into or fitted to the openings (12a, 32a) of the movable disk (12, 32) so as to interrupt the flow of liquids and reduce the noise of the system (FIG. 4).

I claim:
1. A valve comprising:
a valve body defining an inlet for receiving fluids and an outlet for discharging fluids, said outlet positioned substantially
a valve body defining an inlet for receiving fluids and an outlet for discharging fluids, said outlet positioned substantially 90 degrss from said inlet;
a fixed disk mounted in said inlet, said fixed disk having an opening;
a movable disk mounted in said valve body, said movable disk having an opening abutting said fixed disk on an axial end of said movable disk, and said movable disk opening abutting said outlet on a circumferential side of said movable disk, a surface of said movable disk defining said movable disk opening, said surface of said movable disk having a continuous parabolic curve extending from the top of said fixed disk to said outlet providing a smoother fluid flow with a lower level of noise and turbulence to achieve a larger flow capacity, said movable disk rotatable into a first position forming a passage between said inlet opening and said outlet, and rotatable into a second position blocking said inlet and said outlet.

2. A valve in accordance with claim 1, wherein:
said fixed disk opening has a substantially half circle shape; and
said movable disk opening abuts said fixed disk with a shape substantially similar to said half circle shape, said parabolic curve extending from a straight part of said half circle shape to said outlet.

3. A valve in accordance with claim 1, wherein:
said fixed disk opening has a substantially quarter circle shape; and
said movable disk opening abuts said fixed disk with a shape substantially similar to said quarter circle shape, said parabolic curve extending from straight pats of said quarter circle shape to said outlet.

4. A valve in accordance with claim 1, further comprising:
notches formed in said parabolic curve surface defining said movable disk opening, said notches interrupting a flow of fluids and reducing noise.

5. A valve in accordance with claim 1, further comprising:
an entrainer connected to said movable disk by two lateral tabs and a central tab, one of said lateral tabs having a head surface continuing with said parabolic curve surface defining said movable disk opening, said entrainer reducing heat transfer from said movable disk;
a disk holder ring splined to said fixed disk and said disk holder ring hooked to said valve body;
a seal fitted between said fixed disk and said disk holder ring;
a control rod connected to said entrainer for rotating said movable disk;
a seal between said valve body and said entrainer; and
a seal between said connecting rod and said valve body.

* * * * *